US009342639B1

(12) United States Patent  
Casey et al.

(10) Patent No.: US 9,342,639 B1  
(45) Date of Patent: May 17, 2016

(54) METHOD OF HIERARCHICAL TIMING CLOSURE OF VLSI CIRCUITS USING PARTIALLY DISRUPTIVE FEEDBACK ASSERTIONS

(71) Applicant: International Business Machines Corporation, Armonk, NY (US)

(72) Inventors: Christine Casey, Hillsborough, NC (US); Kerim Kalafala, Rhinebeck, NY (US); Ravichander Ledalla, Fishkill, NY (US); Debjit Sinha, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/623,835

(22) Filed: Feb. 17, 2015

(51) Int. Cl.  
    *G06F 17/50* (2006.01)

(52) U.S. Cl.  
    CPC ........ *G06F 17/5031* (2013.01); *G06F 17/5081* (2013.01); *G06F 17/5068* (2013.01)

(58) Field of Classification Search  
    CPC ............ G06F 17/5031; G06F 17/5081; G06F 17/5068  
    See application file for complete search history.

(56) References Cited

U.S. PATENT DOCUMENTS

| | | | | |
|---|---|---|---|---|
| 7,013,443 B2* | 3/2006 | Iwai | ..................... | G06F 17/5022 716/114 |
| 7,306,100 B1 | 12/2007 | Eslambolchi et al. | | |
| 7,428,716 B2 | 9/2008 | Visweswariah | | |
| 7,437,697 B2* | 10/2008 | Venkateswaran | ... | G06F 17/5031 716/113 |
| 7,853,912 B2* | 12/2010 | Binder | ................ | G06F 17/5031 716/113 |
| 8,122,404 B2 | 2/2012 | Sinha et al. | | |
| 8,250,509 B2* | 8/2012 | Daede | ................. | G06F 17/5031 716/108 |
| 9,058,456 B2* | 6/2015 | Haller | ................. | G06F 17/5036 |
| 2008/0307374 A1* | 12/2008 | Gregerson | .......... | G06F 17/5031 716/113 |
| 2009/0119630 A1* | 5/2009 | Binder | ................ | G06F 17/5031 716/113 |
| 2012/0124537 A1* | 5/2012 | Daede | ................. | G06F 17/5031 716/113 |
| 2012/0246606 A1* | 9/2012 | Krauch | ............... | G06F 17/5031 716/113 |
| 2014/0089880 A1* | 3/2014 | Haller | ................. | G06F 17/5036 716/113 |

OTHER PUBLICATIONS

First-Order "Incremental Block-Based Statistical Timing Analysis", Visweswariah, et al., IEEE, vol. 25, No. 10, Oct. 2006.

* cited by examiner

*Primary Examiner* — Naum B Levin  
(74) *Attorney, Agent, or Firm* — L. Jeffrey Kelly; Steven Meyers

(57) ABSTRACT

Timing analysis of a chip component using feedback assertions without disrupting the timing of internal latch to latch paths in the chip component maintaining timing accuracy for all the boundary paths. This is achieved by using slack based feedback assertions for non-clock chip inputs and outputs which are used to dynamically derive the arrival time or the required arrival time assertions. The assertions on the clock inputs are not updated via feedback assertions to facilitate non-disruption of the latch to latch path timing. The timing non-disruption of the resulting latch to latch paths of the chip component increases the designer productivity during timing closure resulting in a shortened time to take the chip design through timing closure to manufacturing. This method is applicable for statistical as well as deterministic timing analysis.

16 Claims, 6 Drawing Sheets

RESULTS FROM STA AT PARENT HIERARCHY LEVEL

| PIN | ARRIVAL TIME (AT) | REQUIRED ARRIVAL TIME (RAT) | SLACK (=RAT- AT) |
|---|---|---|---|
| DATA | 15 | 12 | -3 |
| CLOCK | 2 | 24 | 22 |
| OUT | 18 | 40 | 22 |

301

CAPTURED FEEDBACK ASSERTIONS FOR ABSTRACT FROM PARENT LEVEL STA

| PIN | ARRIVAL TIME (AT) | REQUIRED ARRIVAL TIME (RAT) |
|---|---|---|
| DATA | 15 | - |
| CLOCK | 2 | - |
| OUT | - | 40 |

302

RESULTS FROM OOC STA FOR COMPONENT PRIOR TO FEEDBACK ASSERTIONS

| PIN | ARRIVAL TIME (AT) | REQUIRED ARRIVAL TIME (RAT) | SLACK (=RAT- AT) |
|---|---|---|---|
| DATA | 11 | 10 | -1 |
| CLOCK | 0 | 27 | 27 |
| OUT | 16 | 43 | 27 |

401

RESULTS FROM OOC STA FOR COMPONENT AFTER APPLYING FEEDBACK ASSERTIONS

| PIN | ARRIVAL TIME (AT) | REQUIRED ARRIVAL TIME (RAT) | SLACK (=RAT- AT) |
|---|---|---|---|
| DATA | 15 | 12 | -3 |
| CLOCK | 2 | 24 | 22 |
| OUT | 18 | 40 | 22 |

402

CAPTURED FEEDBACK ASSERTIONS INCLUDING SLACK FOR ABSTRACT FROM PARENT LEVEL STA

| PIN | ARRIVAL TIME (AT) | REQUIRED ARRIVAL TIME (RAT) | SLACK (=RAT- AT) |
|---|---|---|---|
| DATA | 15 | - | -3 |
| CLOCK | 2 | - | 22 |
| OUT | - | 40 | 22 |

RESULTS FROM OOC STA FOR COMPONENT PRIOR TO FEEDBACK ASSERTIONS

| PIN | ARRIVAL TIME (AT) | REQUIRED ARRIVAL TIME (RAT) | SLACK (=RAT- AT) |
|---|---|---|---|
| DATA | 11 | 10 | -1 |
| CLOCK | 0 | 27 | 27 |
| OUT | 16 | 43 | 27 |

801

RESULTS FROM OOC STA FOR COMPONENT AFTER APPLYING PARTIALLY DISRUPTIVE FEEDBACK ASSERTIONS

| PIN | ARRIVAL TIME (AT) | REQUIRED ARRIVAL TIME (RAT) | SLACK (=RAT- AT) |
|---|---|---|---|
| DATA | 13 | 10 | -3 |
| CLOCK | 0 | 22 | 22 |
| OUT | 16 | 38 | 22 |

802

METHOD OF HIERARCHICAL TIMING CLOSURE OF VLSI CIRCUITS USING PARTIALLY DISRUPTIVE FEEDBACK ASSERTIONS

FIELD OF THE INVENTION

The present invention generally relates to the field of Electronic Design Automation (EDA), and more particularly, to the generation and consumption of feedback timing assertions from hierarchical designs for timing closure of design components.

BACKGROUND

Static Timing Analysis (STA) is a key step in the design of high speed Very Large Scale Integrated (VLSI) circuits. STA is used to verify that a VLSI circuit-design performs correctly at a required frequency before it is released for chip manufacturing. A circuit-design must be timing closed prior to manufacturing. Timing closure refers to the process of designing and optimizing a circuit such that applied electrical signals can traverse through the circuit within specified timing constraints. STA guides and validates the completion of timing closure. During STA, a circuit-design is represented as a timing graph; the points in the design where timing information is desired constitute the nodes or timing points of this graph, while electrical or logic connections between these nodes are represented as timing arcs of the graph. STA is performed typically at the logic gate level using lookup-table based gate timing libraries and involves some runtime expensive circuit simulation for timing calculation of wires and gates using current source model based timing libraries.

With modern chip manufacturing technology scaling to sub-45 nanometers, VLSI designs are increasingly getting larger in terms of size and complexity. Application Specific Integrated Circuit (ASIC) designs contain several to a few hundred million logic gates. Performance centric designs, especially microprocessor designs, include custom circuit designed components to achieve aggressive frequency targets and can contain upwards of one billion transistors. STA of these designs ideally like to employ circuit simulators for obtaining accurate timing calculations. However, the run-time intensive nature of circuit simulation is impractical for large designs, especially where timing runs are made daily during the design cycle of the chip. In essence, static timing analysis of modern large circuits as a single flattened design is run-time prohibitive. This has led to the development of a hierarchical timing flow wherein a circuit design is partitioned into components. A component may be partitioned further into sub-components in a recursive fashion. As an example, a typical microprocessor design is partitioned into several components called cores, each core is partitioned into components termed units, and each unit is partitioned into components termed macros. Illustratively, a core level of hierarchy can contain a set of units connected using wires and additional gates that may not be part of any component. Similarly, a unit level of hierarchy can contain a set of macros connected using wires and additional gates that may not be part of any component. For ease of notation, the term "component" will be used in this invention to refer to a sub-component or component (e.g. a macro, unit, or the core).

Referring to FIG. 1, it illustrates a unit component containing two sub-components (macros), namely, Macro-1 and Macro-2, and additional gates and wires. In a hierarchical timing flow, STA and timing closure for each component is performed in isolation or "out of context" (OOC). At this stage, the component is not connected to any other part of the circuit outside its scope. This is followed by the generation of a timing "abstract" that reflects in a simpler form, the timing characteristic of the component. A timing abstract could either be a pruned version of the component or a single gate timing model of the component. As an example of the former style of abstract, internal latch to latch paths of the component are deleted from the design in the abstract model. Known in the present art is described a process of generating the latter style of abstract while accounting for environmental and chip manufacturing variations. The primary objective of creating an abstract is to make the timing model of the component simpler.

Components are next represented using their abstracts at the parent level(s) of hierarchy. The hierarchical timing approach enables fast timing analysis and productivity at the parent level, since the abstract models are simpler and allow re-use. The benefits are significantly highlighted when multiple instances of a component are used at a level since the flow avoids separate static timing analysis for each instance of the full component.

FIG. 2 illustrates a component 200 with two primary inputs and one primary output pin. The component contains three latches, namely, L1, L2 and L3. This component is timed at the out-of-context level (not connected to the parent level of hierarchy), and then an abstract 201 of the component is generated. In this illustrative example, the internal latch to latch path from L1 to L3 is pruned in the abstract model.

A component's abstract is typically generated post timing closure and is then used at the parent level of hierarchy. However, timing closure of the component is dependent on the timing assertions at its boundary (primary input and primary output) pins. As an example, timing closure for a data path starting from a primary input (PI) of a component and leading to either a latch or a primary output (PO) is therefore dependent on when the electrical signal reaches the PI, which in turn is known accurately only at the parent level of hierarchy. This establishes a loop-like situation, wherein an abstract depends on boundary assertions from the parent level, and assertions at the parent level are dependent on the abstract. One way to solve this "chicken and egg" problem is to use some default guard-banded assertions at the cost of "over-design". The alternative approach involves a feedback assertion process, wherein multiple iterations of abstracts are generated during the chip design life-cycle. In each iteration of using an abstract at the parent level of hierarchy, assertions for the component being represented by its abstract are generated, and are subsequently used to perform STA and timing closure of the component. This is followed by the generation of a new abstract for the component post timing closure using assertions from the prior version of the abstract. The new abstract is then used for the next iteration of feedback assertion generation.

FIG. 3 illustrates a parent level of hierarchy wherein component 300 contains an abstract of a sub-component. A set of two numbers is shown on certain pins in the design, and denote the {arrival-time (AT), required-arrival-time (RAT)}, respectively, for the corresponding pin. The source pin of the path that ends at pin DATA of the abstract has an arrival time of 10 units as shown in the figure. Assuming the path delay to be 5 units, it is observed that the pin DATA has an AT of (10+5)=15 units. Since the pin DATA has a RAT of 12 units, the RAT at the source pin of the path leading to DATA is (12−5)=7 units, as shown. Similarly, the CLOCK pin of the abstract has an AT of 2 units, while the AT of pin OUT is 18 units, implying that the path delay from CLOCK to OUT is (18−2)=16 units. Given this path delay and a RAT of 40 units at OUT, the RAT at CLOCK can be verified to be (40−16)=24 units. Finally, the last assumption in the figure is that the RAT at pin DATA is 10 units greater than the AT of pin CLOCK, thus being (2+10)=12 units. All timing values including slack (defined as the difference between RAT and AT) at the boundary pins of the abstract are shown in table 301 of FIG. 3. Based on this timing information at the parent level of hierarchy 300, prior art feedback assertions are generated by simply capturing the AT from inputs pins of the abstract, and the RAT from all output pins of the abstract. Thus, three numerical values are captured as feedback assertions and shown in table 302 of FIG. 3. Given these feedback assertions, and the timing characteristics of the abstract, all other timing values can be re-computed out-of-context, as described next.

FIG. 4 depicts the out-of-context timing computation and use of feedback assertions for a component 400. The abstract of this component is assumed to be the one used at the parent level of hierarchy 300 in FIG. 3. Prior to feedback assertions, the component 400 is assumed to have been timed using default (or older) assertions which are highlighted as underlined values in table 401. The table 401 contains all timing information computed using these assertions as well. The timing values are based on the assumptions made in the prior section, namely, the path delay from CLOCK to OUT is 16 units, and the RAT of pin DATA is 10 units greater than the AT of pin CLOCK. When feedback assertions (as illustrated in table 302 of FIG. 3) are applied to 400, the timing at various pins in the design is naturally updated, and the final results are shown in table 402. It is observed that updating assertions typically changes the AT, RAT, and slack on most pins of the design (except the asserted timing values). As an example, the slack at pin DATA changes from −1 units to −3 units with feedback assertions. This implies that the design needs to be optimized to compensate for a failing 3 units of timing as part of design closure. Not applying feedback assertions would wrongly imply design closure to only fix 1 unit of failing slack, and clearly illustrates the need for iterative feedback assertion based hierarchical design closure to ensure correct operation of the manufactured chip.

The main advantage of the feedback assertion process is that the most accurate data and clock signal timings at the boundary pins of the component's abstract (as observed during STA at a parent level of hierarchy) are used for timing closure of the component during its "out of context" timing. This enables accurate timing closure of boundary paths of the component. However, a new feedback assertion for a clock PI of the component also impacts the timing of internal latch to latch paths, which may be undesirable. As an example, applying feedback assertions 302 in FIG. 3 to component 400 in FIG. 4 updates the AT of pins CLOCK and OUT as shown in table 401 to new values as shown in table 402. While this aids correctly calculated slacks at these pins, the updated timing for this clock path (from CLOCK to OUT) has undesirable effects for component designers. Designers often perform timing closure of these internal paths up front, since these paths are conceptually independent of the boundary assertions under strict clock signal slew and skew restrictions. Component designers may even choose to use some guard banded default assertions for the timing closure of the internal latch to latch paths, and would like to avoid any timing changes or "disruptions" in these paths given new feedback assertions. The prior art method of generating feedback assertions provides new timing assertions for the clock PI pins and thus disrupts the timing of the internal latch to latch paths causing unnecessary optimization or changes in these paths as part of timing closure. A method of not using the new assertions for the clock PI pins, but using new assertions for non-clock PI pins will result in inconsistent timing of boundary paths, and may even lead to a false illusion of timing closure eventually resulting in a faulty manufactured chip design. Finally, a method of not using feedback assertions at all for out-of-context STA of the component is equally susceptible to yielding a faulty manufactured chip. This indicates a need for a method of generating feedback assertions that guarantee timing non-disruptions to the internal latch to latch paths, yet maintain the accuracy of timing closure in the boundary paths of the component.

SUMMARY

Accordingly, an embodiment provides a method and a system for generating and consumption of feedback assertions that do not disrupt timing of internal latch to latch paths during out of context timing of a component during hierarchical timing.

In an embodiment, it provides a method and a system for capturing feedback assertions in the form of slack to be applied during out-of-context timing.

In another embodiment, a method and a system for computing one of arrival time or required arrival time dynamically to be applied as an assertion from a captured slack assertion is provided.

In yet another embodiment, a method and a system achieve the generation and consumption of statistical feedback assertions that does not disrupt timing of internal latch to latch paths during out-of-context statistical timing of a component during hierarchical statistical timing. The generated assertions guarantee timing non-disruption in certain sections of the design component being timed with the assertions, thereby improving chip design and optimization productivity prior to chip manufacturing.

These and other objects, aspects and advantages of embodiments provide a method and a system generating feedback assertions in the form of slack for non-clock inputs and outputs of a component. Such assertions are used to dynamically compute arrival time and required arrival time assertions based on existing timing at the primary inputs and outputs, respectively, such that the out-of-context timing of a component's clock path is not disrupted. The timing non-disruption of the resulting latch to latch paths of a design helps increase designer productivity during timing closure which results in a shortened time to take a chip design through timing closure to manufacturing.

BRIEF DESCRIPTION OF DRAWINGS

The accompanying drawings, which are incorporated in and which constitute part of the specification, illustrate the presently preferred embodiments which, together with the general description given above and the detailed description of the preferred embodiments given below serve to explain the principles of the embodiments.

DETAILED DESCRIPTION

Figure 1:
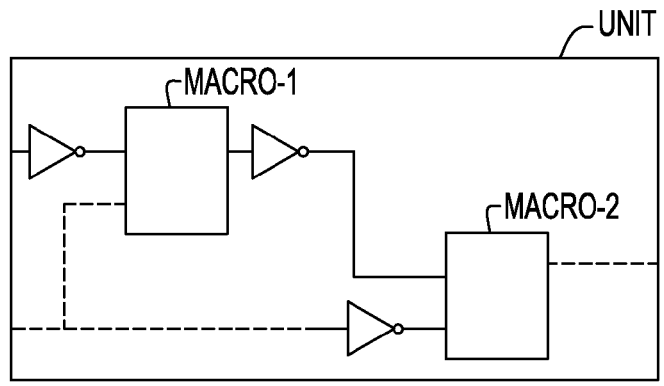
FIG. 1 shows a prior art illustrative unit component of a hierarchical chip design containing macro sub-components.
Figure 2:
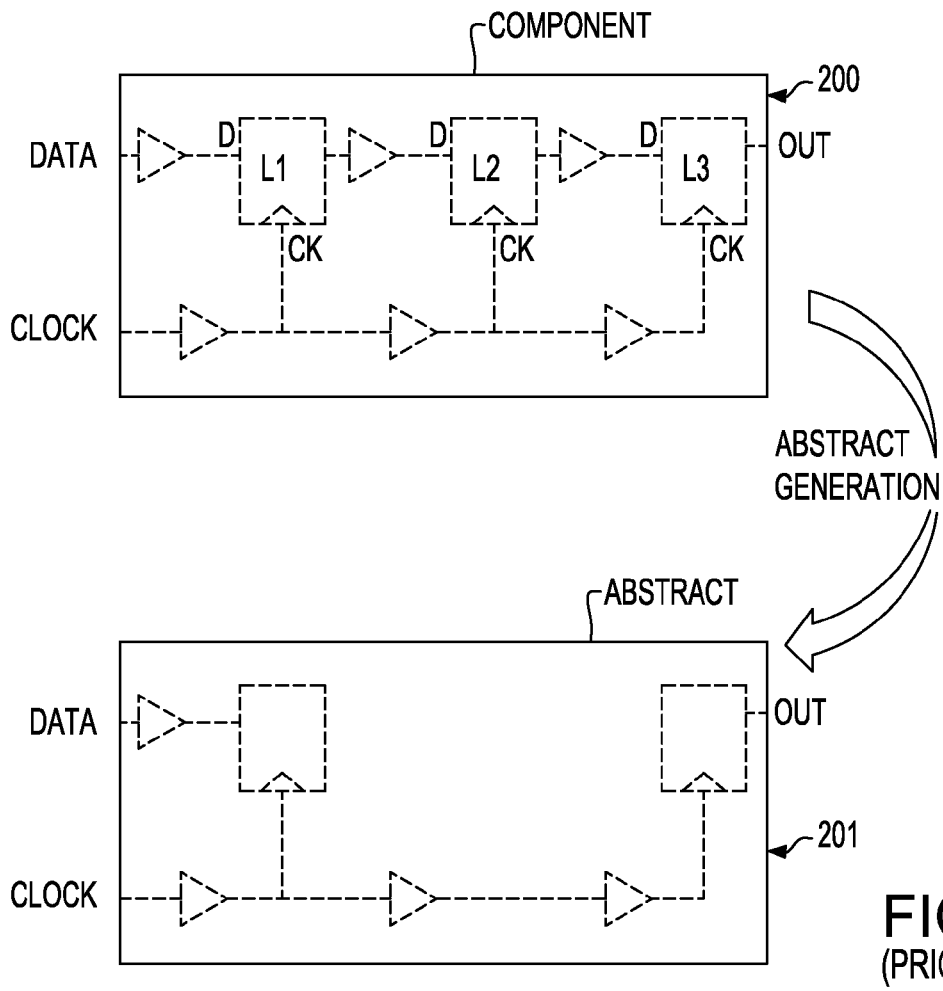
FIG. 2 illustrates the prior art illustrative generation of a timing abstract for a component containing two inputs, one output and three latches.

Embodiments of the present invention and various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments in detail.

Figure 5:
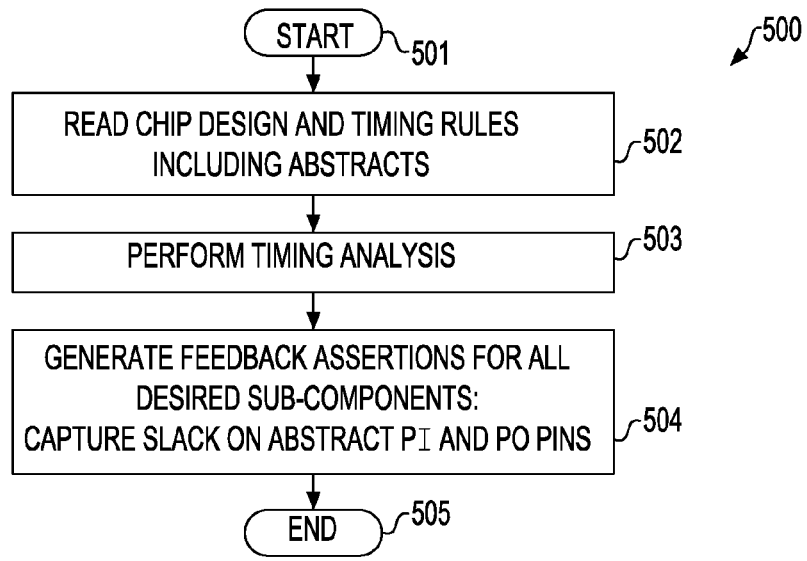
FIG. 5 is a flowchart illustrating the steps of generating feedback assertions in the form of slack, in accordance of an embodiment.

FIG. 5 is a flow diagram illustrating one embodiment of a method 500 for generating feedback assertions for a sub-component at the parent level of hierarchy for that sub-component. The method 500 is initialized in step 501. In step 502, a component of a hierarchical chip design is read in along with the timing models for all included sub-components and gates, as well as timing assertions. Each included sub-component could be either a detailed partition containing gates and wires, or an abstract model of the sub-component that it replaces at the current level of hierarchy. Gates and abstract timing models examples include industry standard timing models like Liberty, ECSM and CCS. The design may also include transistor level logic which requires a circuit simulator to obtain delay and slew (or waveform) information during static timing analysis. In step 503, static timing analysis (STA) of the component is performed, wherein timing quantities like arrival times (AT) and required arrival times (RAT) are computed for all desired pins in the design. As part of STA, slacks are also obtained at all desired pins. This step may include traditional static timing analysis related steps like coupling analysis, common path pessimism reduction, and report generation.

In step 504, feedback assertions for each desired unique sub-component type is generated. As part of this step, the slack on each output pin of the sub-component is captured. The slack for each non-clock input pin of the sub-component is also captured. The traditional method of capturing the AT for each input pin, and the RAT for each output pin, respectively, is performed optionally. Other aspects of feedback assertions, including capturing the slew on input pins and effective loads on outputs pins are performed in the traditional fashion. In the presence of multiple clock phases for the design, feedback assertions on the boundary (input and output) pins are captured for each phase individually. In another embodiment, a reduced set of assertions may be captured by filtering the assertions for non-critical clock phases. If the component has multiple instances of a sub-component, the captured slack could correspond to a pre-decided instance of the sub-component. The decision to choose a critical sub-component could be based on slack. In another embodiment, the worst slack across multiple instances of a given boundary pin of a given sub-component type is captured as the feedback assertion. The method 500 for generating feedback assertions for the sub-component terminates in step 505.

Figure 3:
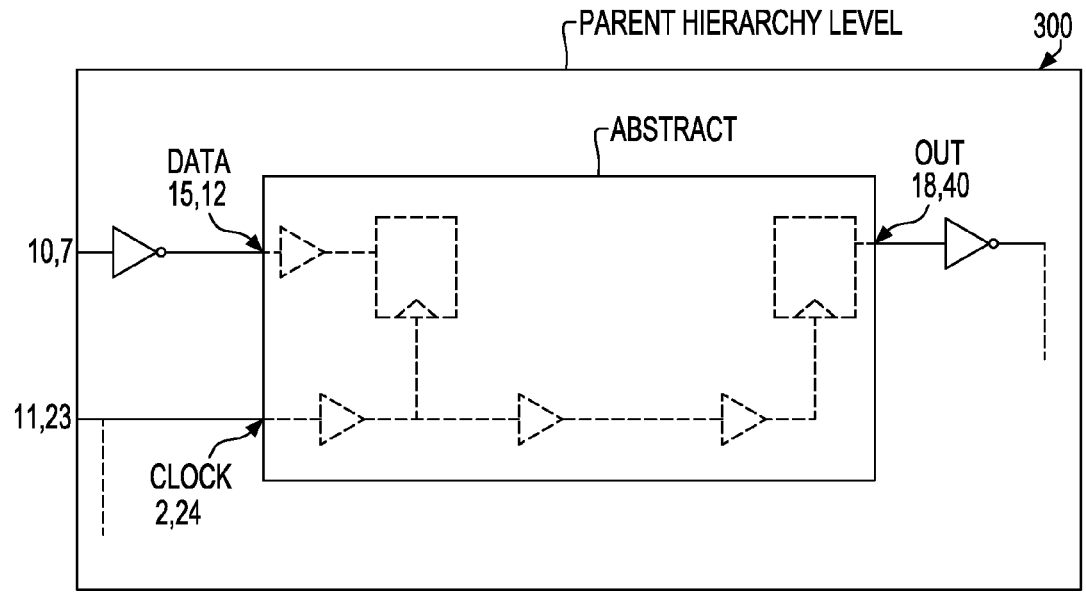
FIG. 3 illustrates a prior art illustrative structure and timing of an abstract at its parent level of hierarchy, and generated feedback assertions.
Figure 6:
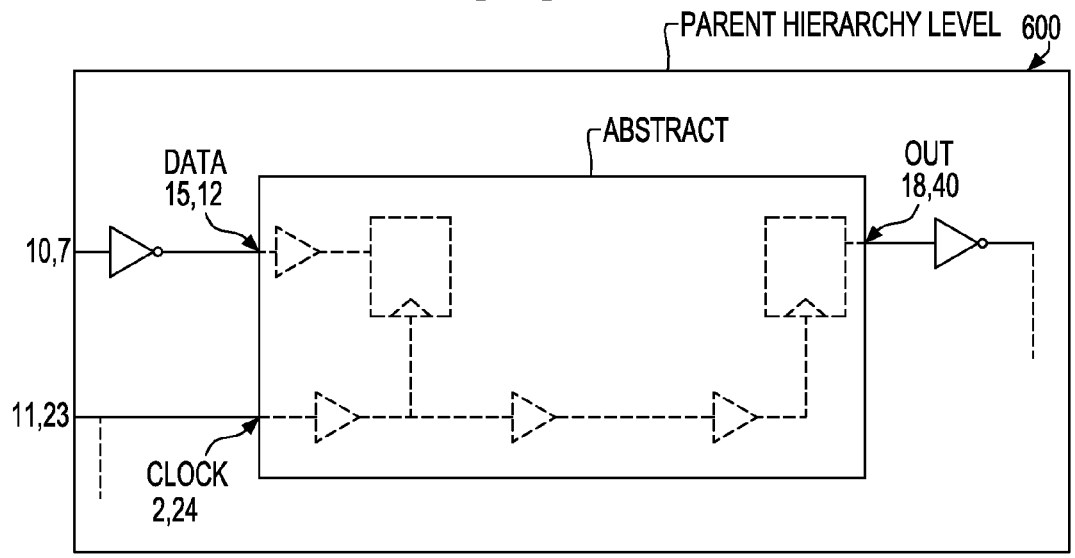
FIG. 6 illustrates capturing of feedback assertions in the form of slack for an abstract at its parents level of hierarchy, according to an embodiment.

FIG. 6 illustrates a parent level of hierarchy wherein component 600 contains an abstract of a sub-component. The design illustrated in this figure and the timing information shown is identical to that in FIG. 3. While traditional feedback assertions for the abstract as shown in table 302 of FIG. 3 does not contain any slack information, in one embodiment as described in the flow-diagram 500 of FIG. 5, the feedback assertions include slack information for all output and non-clock input pins as shown in table 601 of FIG. 6. In the figure, the AT and RAT on some boundary pins are captured as well.

Figure 7:
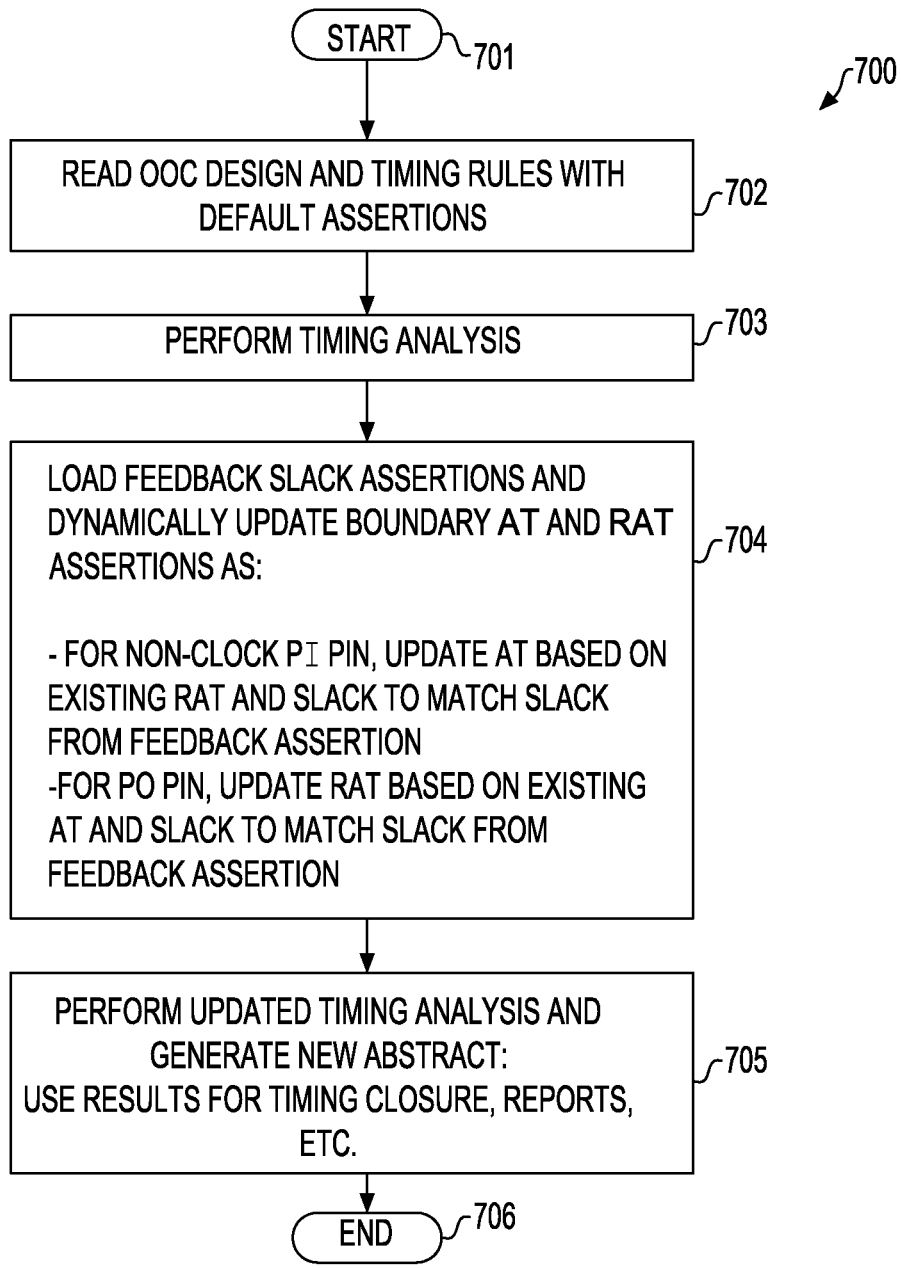
FIG. 7 is a flowchart illustrating the steps for consuming the feedback assertions captured in a slack form for the out-of-context timing of a component, according to an embodiment.

FIG. 7 is a flow diagram illustrating one embodiment of a method 700 for hierarchical timing analysis at the out-of-context (OOC) level of a component using feedback slack assertions generated from the component's parent level of hierarchy. The method 700 is initialized in step 701. In step 702, the component circuit is read along with the timing models for all gates (or transistors) and wires in the component. Default or older timing assertions for the circuit are also read in during this step.

Static timing analysis (STA) of the circuit is next performed in step 703, wherein timing quantities like delays and slews are propagated throughout the timing graph to obtain arrival times at the primary outputs. Required arrival times are propagated in a traditional manner backwards from the primary outputs to the primary inputs, and subsequently slacks are obtained at all desired timing pins. This step may include traditional static timing analysis related steps like coupling analysis, common path pessimism reduction, and report generation.

Generated slack based feedback assertions are next loaded in step 704. As part of this step, for each non-clock primary input I, the existing RAT at this pin $RAT_I$ is used in conjunction with the feedback assertion slack $SLK^*_I$ to generate a new arrival time (AT) assertion: $AT^*_I$. The main idea is that the new generated arrival time assertion $AT^*_I$ and $RAT_I$ should result in the slack that was captured during assertion generation at the parent level of hierarchy. Mathematically, this implies the following:

$RAT_I - AT^*_I = SLK^*_I$. Therefore:

$$AT^*_I = RAT_I - SLK^*_I. \hspace{2cm} \text{E.Q. (1)}$$

The dynamically generated AT assertion is thus obtained by subtracting the feedback slack assertion from the computed RAT at the pin. It should be noted that this example illustrates timing computation in the late mode, wherein slack is defined as (RAT−AT). For early mode of calculation, wherein slack is defined as (AT−RAT), the calculation is modified accordingly.

The above is repeated for each desired non-clock input pin. As part of multiple embodiments, incremental timing may or may not be performed in between the computations of the new arrival times for different input pins. For each output pin O, the existing AT on this pin $AT_O$ is used in conjunction with the feedback assertion slack $SLK^*_O$ to generate a new required arrival time (RAT) assertion: $RAT^*_O$. The main idea is that the new generated required arrival time assertion $RAT^*_O$ and $AT_O$ should result in the slack that was captured during assertion generation at the parent level of hierarchy. Mathematically, this implies the following:

$RAT^*_O - AT_O = SLK^*_O$. Therefore:

$$RAT^*_O = AT_O + SLK^*_O. \hspace{2cm} \text{E.Q. (2)}$$

The dynamically generated RAT assertion is thus obtained by adding the feedback slack assertion to the computed AT on the pin. It should be noted that this example illustrates timing computation in the late mode, wherein slack is defined as (RAT−AT). For early mode of calculation, wherein slack is defined as (AT−RAT), the calculation is modified accordingly. In another embodiment of this invention, if the design contains a combinational path from a non-clock input to an output, only one end of the path is updated with a new assertion. As an example, either just the input would be updated with a new AT, or the output would be updated with a new RAT.

Once all desired boundary pins have been updated with new assertions based on feedback slack assertions, a final timing analysis is performed in step 705 to ensure the timing of the design is update. Additional steps of timing including coupling analysis, common path pessimism removal and report generation may be performed at this stage. A new abstract is also generated at this step. The method terminates in step 706.

Figure 4:
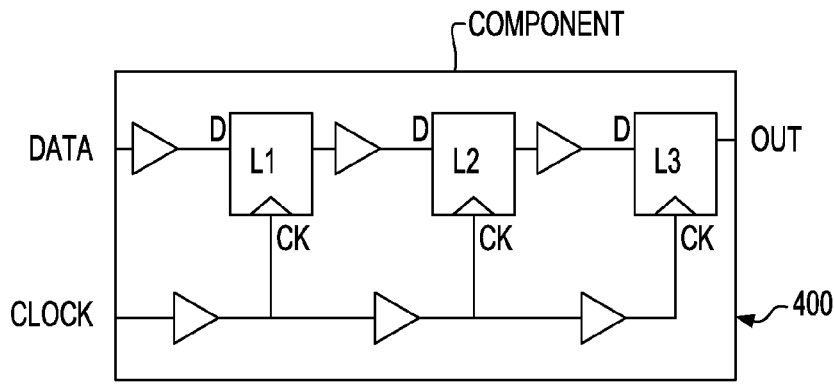
FIG. 4 illustrates a prior art illustrative structure and timing of a component out-of-context, and the updated time post application of feedback assertions.
Figure 8:
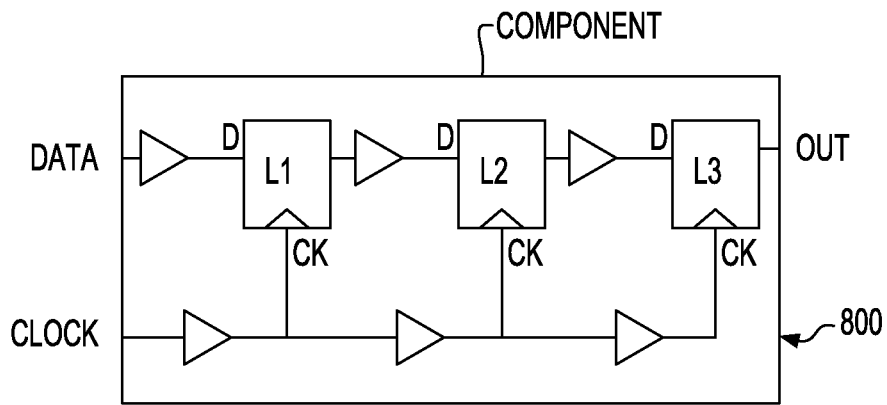
FIG. 8 illustrates dynamically generated assertions from captured feedback assertions for a component and its resulting timing, according to an embodiment.

FIG. 8 illustrates the out-of-context timing computation and use of slack based feedback assertions for a component 800. The scenario is identical to that of component 400 in FIG. 4. The abstract of this component is assumed to be the one used at the parent level of hierarchy 600 in FIG. 6. Prior to feedback assertions, the component 800 is assumed to have been timed using default (or older) assertions which are highlighted as underlined values in table 801. The table 801 contains all timing information computed using these assertions as well, and is identical to table 401 of FIG. 4. When slack based feedback assertions (as illustrated in table 601 of FIG. 6) are applied to 800, the timing at various pins in the design is updated as follows. The AT assertion of the clock input pin CLOCK is left unchanged. For the non-clock input pin DATA, a new AT assertion is generated dynamically based on E.Q. (1) and values from table 801 of FIG. 8 and table 601 of FIG. 6 as:

$$AT^*_{DATA} = RAT_{DATA} - SLK^*_{DATA}.$$ Therefore, $$AT^*_{DATA} = 10-(-3) = 13 \text{ units. This is shown in table } 802.$$

Similarly, for the output pin OUT, a new RAT assertion is generated dynamically based on E.Q. (2) and values from table 801 of FIG. 8 and table 601 of FIG. 6 as:

$$RAT^*_{OUT} = AT_{OUT} + SLK^*_{OUT}.$$ Therefore, $$RAT^*_{OUT} = 16+22 = 38 \text{ units. This is shown in table } 802.$$

It is observed that updating assertions based on the feedback slack assertions changes the AT, RAT, and slack on some pins of the design. However, the final slack values computed for the three boundary pins as shown in table 802 of FIG. 8 matches the slacks in table 402 of FIG. 4. This indicates that the invention achieves the same accuracy of the traditional method. At the same time, it is also observed that the clock path timings have not changed, that is, the arrival times on the CLOCK and OUT pins are unchanged. This is exactly what is desired by designers, specifically, obtaining accurate slack post feedback assertions without impacting clock path arrival times. This invention achieves the result effectively.

In another embodiment, the slack based feedback assertion does not capture slack at the parent level of hierarchy. Instead, traditional feedback assertions are generated. During out-of-context (OOC) timing, traditional feedback assertions are loaded traditionally and timing is performed to obtain slacks at boundary pins. At this stage, these slacks are captured as slack based feedback assertions. This embodiment facilitates capturing slack based feedback assertions at the OOC level instead of the parent level. This method is advantageous when traditional (non slack based) feedback assertions are already available, and it is undesirable to generate (slack based) feedback assertions again at the parent level of hierarchy. In yet another embodiment, the traditional feedback assertions from the parent level are loaded in an OOC run of the abstract of the component instead of the detailed component, and slack based feedback assertions are generated as described above. Flow 700 as illustrated in FIG. 7 can next be applied as described earlier.

In a still another embodiment, the results of the preliminary timing analysis using default or older assertions may be performed using the abstract of the OOC component instead of the detailed component. This would enable obtaining quantities like $RAT_I$ and $AT_O$ as shown in E.Q. (1) and E.Q. (2), respectively, more efficiently.

As another embodiment, statistical slack based feedback assertions may be generated and used. In this embodiment, the slacks captured during timing (either multi-corner or statistical) at the parent level of hierarchy would be captured in a variability aware fashion, an example of which is statistical slack. During loading of this statistical slack based feedback assertion, new statistical arrival times and statistical required arrival times would be dynamically generated based on E.Q. (1) and E.Q. (2), wherein each timing quantity like AT, RAT and slack is a statistical quantity instead of a deterministic value. Addition and subtraction of statistical quantities are performed traditionally.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. While the foregoing is directed to embodiments of the present invention, other and further embodiments, may be devised without departing from the basic scope thereof.

What is claimed is:

1. A method for timing analysis of a component of an integrated circuit (IC) chip design using slack based feedback assertions, the method comprising:
    obtaining, using an electronic design automation system, a slack based feedback assertion for at least one boundary pin of the component, the slack based feedback assertion is generated from the component's parent level of hierarchy;
    performing timing analysis of the component at the out-of-context level of hierarchy to obtain an arrival time, a required arrival time, and a slack timing value at the at least one boundary pin, the slack timing value is equal to the required arrival time minus the arrival time;
    computing a new assertion including a new arrival time and a new required arrival time at the at least one boundary pin using the slack based feedback assertion and the result of the timing analysis, wherein the slack timing value obtained during the timing analysis is replaced with a slack timing value of the slack based feedback assertions; and
    employing the new assertion to perform an updated timing analysis of the component as part of timing closure of the chip design prior to chip manufacturing.

2. The method of claim 1, wherein the slack based feedback assertion for said at least one boundary pin is obtained from the result of timing analysis of the component at a parent level of hierarchy.

3. The method of claim 2, wherein the parent level of hierarchy contains at least one abstract of the component.

4. The method of claim 1, wherein the slack based feedback assertion comprises a slack timing value for the boundary pin and either an arrival time from an input pin or a required arrival time from an output pin.

5. The method of claim 1, wherein the slack based feedback assertion for the at least one boundary pin is generated from a timing abstract of the component at the component's parent level of hierarchy.

6. The method of claim 1, wherein the at least one boundary pin is a non clock input pin, and wherein the new assertion is computed using the slack based feedback assertion and the required arrival time at the at least one boundary pin.

7. The method of claim 1, wherein the at least one boundary pin is an output pin, and wherein the new assertion is computed using the slack based feedback assertion and the arrival time at the at least one boundary pin.

8. The method of claim 1, wherein if the at least one boundary pin is an output pin, and has a combinational path from at least one non clock input pin, the new assertion is not computed.

9. The method of claim 1, wherein if the at least one boundary pin is not a clock input pin, and has a combinational path to an output pin, the new assertion is not computed.

10. The method of claim 1, wherein the slack based feedback assertions are statistical assertions, and the timing analyses are statistical timing analyses.

11. A method for timing analysis of a component of an integrated circuit (IC) chip design, the component is partitioned into one or more sub-components, the method comprising:

generating, using an electronic design automation system, feedback assertions for boundary pins of a sub-component at a parent level of hierarchy, the feedback assertions comprising slack values for all output pins and all non-clock input pins of the sub-component;

performing timing analysis of the sub-component at the out-of-context level of hierarchy to obtain arrival times at primary output pins, required arrival times at primary input pins, and slack values at all boundary pins of the sub-component, the slack values being equal to a difference between the arrival time and the required arrival time for each respective boundary pin;

updating the arrival times obtained by the timing analysis for all non-clock primary input pins of the sub-component such that the updated arrival times and the required arrival times obtained by the timing analysis yield the generated slack values of the feedback assertion for each non-clock primary input pin, respectively; and updating the required arrival times obtained by the timing analysis for all primary output pins of the sub-component such that the updated required arrival times and the arrival times obtained by the timing analysis yield the generated slack values of the feedback assertion for each primary output pin, respectively.

12. The method of claim 11, wherein generating the feedback assertions for a sub-component at a parent level of hierarchy comprises:

generating the feedback assertions from a timing abstract of the sub-component at the component's parent level of hierarchy.

13. The method of claim 11, wherein generating the feedback assertions for the sub-component at a parent level of hierarchy comprises:

generating feedback assertions for the boundary pins for each clock phase.

14. The method of claim 11, wherein the slack based feedback assertions are statistical assertions, and the timing analyses are statistical timing analyses.

15. The method of claim 11, further comprising:

performing an updated timing analysis of the sub-component at the out-of-context level of hierarchy based on the updated arrival times and the updated required arrival times.

16. The method of claim 15, further comprising:

generating a new timing abstract for the sub-component based on the updated timing analysis.

* * * * *